(12) United States Patent
Cho et al.

(10) Patent No.: US 7,952,828 B2
(45) Date of Patent: May 31, 2011

(54) HARD DISK DRIVE, METHOD FOR PARKING MAGNETIC HEAD OF HARD DISK DRIVE, AND COMPUTER READABLE RECORDING MEDIUM RECORDING THE METHOD

(75) Inventors: Hyung-Joon Cho, Seoul (KR); Jin-Seak Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 11/359,579

(22) Filed: Feb. 23, 2006

(65) Prior Publication Data

US 2007/0053096 A1 Mar. 8, 2007

(30) Foreign Application Priority Data

Sep. 2, 2005 (KR) .................. 10-2005-0081930

(51) Int. Cl.
*G11B 21/02* (2006.01)
(52) U.S. Cl. .......................................... 360/75
(58) Field of Classification Search .................. None
See application file for complete search history.

(56) References Cited

U.S. PATENT DOCUMENTS

| | | | | | |
|---|---|---|---|---|---|
| 4,885,517 | A | * | 12/1989 | Pennock | 318/678 |
| 5,204,593 | A | * | 4/1993 | Ueki | 318/254 |
| 5,384,524 | A | * | 1/1995 | Romano | 318/569 |
| 5,455,496 | A | * | 10/1995 | Williams et al. | 318/563 |
| 5,495,156 | A | * | 2/1996 | Wilson et al. | 318/368 |
| 5,504,402 | A | * | 4/1996 | Menegoli | 318/377 |
| 5,898,283 | A | * | 4/1999 | Bennett | 318/254 |
| 6,025,968 | A | | 2/2000 | Albrecht | 360/75 |
| 6,081,400 | A | * | 6/2000 | Lu et al. | 360/75 |
| 6,181,502 | B1 | * | 1/2001 | Hussein et al. | 360/69 |
| 6,282,049 | B1 | * | 8/2001 | Cameron et al. | 360/75 |
| 6,369,973 | B1 | * | 4/2002 | Mushika et al. | 360/78.07 |
| 6,490,116 | B1 | * | 12/2002 | Watanabe et al. | 360/75 |
| 6,765,746 | B2 | * | 7/2004 | Kusumoto | 360/75 |

FOREIGN PATENT DOCUMENTS

| | | |
|---|---|---|
| JP | 2000-113618 | 4/2000 |
| JP | 2002-208238 | 7/2002 |
| JP | 2004-086982 | 3/2004 |
| KR | 10-1992-0005210 | 6/1992 |
| KR | 10-1995-0000049 | 1/1995 |

OTHER PUBLICATIONS

SGS-Thomson Specification for L6260, Nov. 1996.*

* cited by examiner

*Primary Examiner* — Kin C. Wong
(74) *Attorney, Agent, or Firm* — Staas & Halsey LLP

(57) ABSTRACT

A hard disk drive which includes a voice coil motor driving portion which supplies drive current to a voice coil motor, and a controller which compares a supply voltage supplied to predetermined chips installed on a printed circuit board with a parking reference voltage previously set to a voltage higher than a power-on-reset voltage and controls the voice coil motor driving portion to apply current to a voice coil of the voice coil motor through the voice coil motor driving portion to park a magnetic head in a predetermined parking zone, when the supply voltage is lower than the parking reference voltage.

11 Claims, 6 Drawing Sheets

HARD DISK DRIVE, METHOD FOR PARKING MAGNETIC HEAD OF HARD DISK DRIVE, AND COMPUTER READABLE RECORDING MEDIUM RECORDING THE METHOD

CROSS-REFERENCE TO RELATED APPLICATION

This application claims the priority of Korean Patent Application No. 10-2005-0081930, filed on 2 Sep. 2005, in the Korean Intellectual Property Office, the disclosure of which is incorporated herein by reference.

BACKGROUND OF THE INVENTION

1. Field of the Invention

The present invention relates to a hard disk drive, a method for parking a magnetic head of the hard disk drive, and a computer readable recording medium recording a program to execute the method, and more particularly, to a hard disk drive which can park a magnetic head of the hard disk drive in a predetermined parking area without using a counter electromotive force of a spindle motor when the magnetic head is difficult to park using the counter electromotive force because the counter electromotive force of the spindle motor is very small as in a 1 inch or less compact hard disk drive used for mobile devices, a method for parking a magnetic head of the hard disk drive, and a computer readable recording medium recording a program to execute the method.

2. Description of Related Art

Hard disk drives (HDDs) formed of electronic parts and mechanical parts is are memory devices to record and reproduce data by converting digital electric pulses to a magnetic field that is more permanent. The HDDs are widely used as auxiliary memory devices of computer systems because of fast access time to a large amount of data.

With the recent increase in TPI (track per inch; a density in a direction along the rotation of a disk) and BPI (bits per inch; a density in a direction along the thickness of a disk), the HDD has achieved a high capacity and its application field has expanded. Accordingly, there has been a request for development of compact HDDs which can be used for portable electronic products such as notebooks, personal digital assistants (PDAs), and mobile phones. Actually, a compact HDD having a diameter of 0.85 inches, which has a size similar to a coin, has been recently developed and is expected to be used for mobile phones in the future.

The HDD includes a disk for recording data, a spindle motor for rotating the disk, and an actuator having a magnetic head to record data on the disk and reproduce data from the disk. The actuator pivots around a pivot shaft by means of a voice coil motor (VCM) and includes an actuator arm rotatably coupled to the pivot shaft, a slider on which a magnetic head is mounted, and a suspension installed at the actuator arm to support the slider to be elastically biased toward the surface of the disk.

One or more disks are installed with a predetermined interval therebetween to be rotated by the spindle motor. In general, a parking zone where the slider with the magnetic head is accommodated during parking off is provided at the inner circumferential side of the disk while a data zone where a magnetic signal is recorded is provided at the outer side of the parking zone.

During the recording and reproduction of data, a lift force generated by airflow moved by the rotation of the disk and an elastic force by the suspension act on the slider with the magnetic head. Accordingly, the slider maintains a state of being lifted above the data zone of the disk at a height where the lift force and the elastic force are balanced. Thus, the magnetic head mounted on the slider records and reproduces data with respect to the disk while maintaining a particular gap with the disk that is rotating. When the power is off and the rotation of disk is stopped, the lift force that lifts the slider disappears. Thus, the slider needs to be out of the data zone of the disk before the lift force disappears to prevent damage to the data zone due to a contact between the slider and the data zone. That is, before the rotation of disk is completely stopped, the actuator arm is rotated to move the slider to the parking zone of the disk. Accordingly, even when the rotation of disk is stopped, since the magnetic head is accommodated in the parking zone, the damage to the data zone can be prevented.

Therefore, when the power to the hard disk drive is cut off so that the rotation of disk is stopped, it is common that the magnetic head mounted on the slider is parked by moving the same to the parking zone of the disk before the rotation of disk is completed stopped.

In the meantime, as a method for parking the magnetic head in a safe place before the rotation of disk is stopped as the power is off, current is applied to a voice coil of the voice coil motor by a counter electromotive force of the spindle motor when the power is off so that the magnetic head is parked in a predetermined parking zone. For hard disk drives having a size such as 3.5 or 2.5 inches, since the counter electromotive force of the spindle motor is not small, the current needed to park the magnet head can be supplied. However, for compact hard disk drives having a size of 1 inch or less which is used for mobile devices, since the counter electromotive force is very small, it is difficult to park the magnetic head with the counter electromotive force only.

Considering the above problem, in a compact hard disk drive having a size of 1 inch or less, since it is difficult to apply current needed to park the magnetic head to the voice coil of the voice coil motor as the counter electromotive force of the spindle motor is very small, a capacitor electrically connected to the voice coil of the voice coil motor is installed on a printed circuit board (PCB). Thus, when the power is applied to the hard disk drive, current is charged to the capacitor and when the power is off, the current charged in the capacitor is discharged to the voice coil of the voice coil motor so that the magnetic head is parked.

However, when the magnetic head is parked by supplying the current charged in the capacitor that is electrically connected to the voice coil of the voice coil motor to the voice coil, the captor needs to be installed on the PCB. For the compact hard disk drive having a size of 1 inch or less that is used for mobile devices, since there is a limit in the area of the PCB, it is difficult to install a large number of capacitors. Even when a sufficient area for a large number of capacitor exists, since a lot of cost is needed to install the capacitors, a production cost is raised.

BRIEF SUMMARY

An aspect of the present invention provides a hard disk drive in which the magnetic head of the hard disk drive is parked in a predetermined parking zone without using the counter electromotive force of the spindle motor, the number of a capacitor that is electrically connected to the voice coil of the voice coil motor is reduced compared to the conventional art, a space for a PCB for installing the capacitor is reduce so that the space for PCB can be effectively used, and a manufacturing cost is reduced, a method for parking a magnetic head of a hard disk drive, and a computer readable recording medium recording a program to execute the method.

According to an aspect of the present invention, there is provided a hard disk drive including a voice coil motor driving portion which supplies drive current to a voice coil motor, and a controller which compares a supply voltage supplied to predetermined chips installed on a printed circuit board with a parking reference voltage previously set to a voltage higher than a power-on-reset voltage and controls the voice coil motor driving portion to apply current to park a magnetic head in a predetermined parking zone, to a voice coil of the voice coil motor through the voice coil motor driving portion, when the supply voltage is lower than the parking reference voltage.

The controller may comprise a voltage comparison portion which compares the supply voltage supplied to the chips on the printed circuit board with the parking reference voltage.

The controller may compare the supply voltage with the power-on-reset voltage and cuts off the supply voltage supplied to the chips on the printed circuit board when the supply voltage is lower than the power-on-reset voltage.

The voice coil motor driving portion may further comprise a capacitor which is electrically connected to the voice coil of the voice coil motor and parks the magnetic head by applying predetermined current to the voice coil of the voice coil motor through the voice coil motor driving portion when the supply voltage supplied to the chips on the printed circuit board is cuts off.

The controller may control the voice coil motor driving portion such that a maximum allowable current is applied to the voice coil of the voice coil motor through the voice coil motor driving portion when current to park the magnetic head in a predetermined parking zone is applied to the voice coil of the voice coil motor through the voice coil motor driving portion.

According to another aspect of the present invention, there is provided a hard disk drive including a voice coil motor driving portion which supplies drive current to a voice coil motor, and a voltage comparison portion which compares a supply voltage supplied to predetermined chips installed on a printed circuit board with a parking reference voltage previously set to a voltage higher than a power-on-reset voltage, and a controller which controls the voice coil motor driving portion to apply current to park a magnetic head in a predetermined parking zone, to a voice coil of the voice coil motor through the voice coil motor driving portion, when the supply voltage is lower than the parking reference voltage.

The controller may compare the supply voltage with the power-on-reset voltage and cuts off the supply voltage supplied to the chips on the printed circuit board when the supply voltage is lower than the power-on-reset voltage.

The voice coil motor driving portion may further comprise a capacitor which is electrically connected to the voice coil of the voice coil motor and parks the magnetic head by applying predetermined current to the voice coil of the voice coil motor through the voice coil motor driving portion when the supply voltage supplied to the chips on the printed circuit board is cuts off.

The controller may controls the voice coil motor driving portion such that a maximum allowable current is applied to the voice coil of the voice coil motor through the voice coil motor driving portion when current to park the magnetic head in a predetermined parking zone is applied to the voice coil of the voice coil motor through the voice coil motor driving portion.

According to another aspect of the present invention, there is provided a method for parking a magnetic head of a hard disk drive which includes comparing a supply voltage supplied to predetermined chips installed on a printed circuit board with a parking reference voltage previously set to a voltage higher than a power-on-reset voltage, and applying current to park a magnetic head in a predetermined parking zone, to a voice coil of the voice coil motor through a voice coil motor driving portion that supplies drive current to the voice coil motor, when the supply voltage is lower than the parking reference voltage.

The method may further comprise comparing the supply voltage with the power-on-reset voltage, and cutting off the supply voltage that is supplied to the chips on the printed circuit board when the supply voltage is lower than the power-on-reset voltage.

The method may further comprise parking the magnetic head by applying current charged in a capacitor that is electrically connected to the voice coil of the voice coil motor to the voice coil of the voice coil motor through the voice coil motor driving portion when the supply voltage supplied to the chips on the printed circuit board is cut off.

In the applying of current to park a magnetic head in a predetermined parking zone, to a voice coil of the voice coil motor through a voice coil motor driving portion, a maximum allowable current may be applied to the voice coil of the voice coil motor through the voice coil motor driving portion.

According to another embodiment of the present invention, there is provided a computer-readable storage medium encoded with processing instructions for causing a processor to execute a method of parking a magnetic head of a hard disk drive. The method including: comparing a supply voltage supplied to predetermined chips installed on a printed circuit board with a parking reference voltage previously set to a voltage higher than a power-on-reset voltage; and applying current to a voice coil of a voice coil motor through a voice coil motor driving portion that supplies drive current to the voice coil motor to park the magnetic head in a predetermined parking zone, when the supply voltage is lower than the parking reference voltage.

According to another embodiment of the present invention, there is provided a method of parking a magnetic head of a hard disk drive, the method including: comparing a supply voltage supplied to predetermined chips installed on a printed circuit board with a parking reference voltage previously set to a voltage higher than a power-on-reset voltage; and parking the magnetic head in a predetermined parking zone by applying current to a voice coil, when the supply voltage is less than the parking reference voltage.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
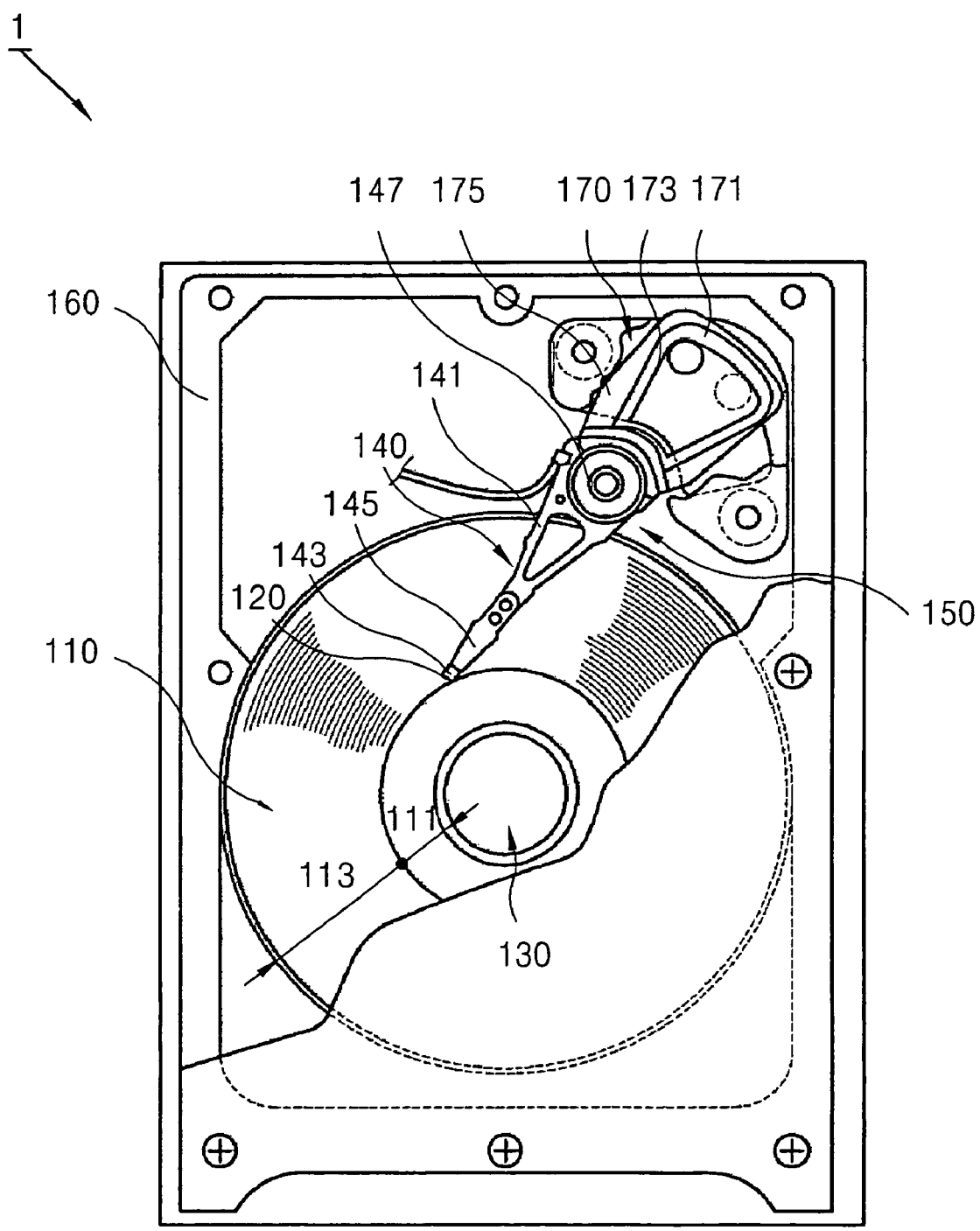
FIG. 1 is a plan view of a hard disk drive according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a plan view of a hard disk drive according to an embodiment of the present invention. Referring to FIG. 1, a hard disk drive 1 according to an embodiment of the present invention includes a disk 110 for recording and storing data, a magnetic head 120 for recording data on the disk 110 or reproducing data from the disk 110, a spindle motor 130 for rotating the disk 110, a head stack assembly (HSA) 150 having an actuator 140 to allow the magnetic head 120 to fly so that the magnetic head 120 can access the data on the disk 110, a printed circuit board assembly (PCBA; not shown) for controlling circuit parts which are installed on a printed circuit board (PCB), and a base 160 on which the above constituent parts are assembled.

The actuator 140 pivots around a pivot shaft 147 by means of a voice coil motor (VCM) 170. That is, the VCM 170 includes a voice coil 173 wound around a bobbin portion 171 and a magnet 175 for generating magnetic field lines. An electromagnetic force is generated by the interaction between the magnetic field lines generated by the magnet 175 and current flowing in the voice coil 173 so that the actuator 140 pivots in a direction following the Fleming's left hand rule. By controlling the electromagnetic force, the magnetic head 120 is moved to a desired position on the disk 110. The actuator 140 includes an actuator arm 141 coupled to the pivot shaft 147 to be capable of pivoting, a slider 143 on which the magnetic head 120 is mounted, and a suspension 145 installed at the actuator arm 141 and supporting the slider 143 to be elastically biased toward a surface of the disk 110.

The magnetic head 120 can read or record information with respect to the disk 110 that is rotating by detecting a magnetic field formed on the surface of the disk 110 or magnetizing the surface of the disk 110. Although a single unit of magnetic head 120 is shown in FIG. 1, the magnetic head 120 includes a head for recording to magnetize the disk 110 and a head for reading to detect the magnetic field of the disk 110.

As the disk 110, a single or plurality of disks are provided by being separated a predetermined interval and rotated by the spindle motor 130. Generally, a parking zone 111 where the slider 143 with the magnetic head 120 mounted thereon during parking off is provided at the inner circumferential side of the disk 110 while a data zone 113 where a magnetic signal is recorded is provided outside the parking zone 111. Thus, when the parking of the magnetic head 120 is completed, the slider 143 with the magnetic head 120 is accommodated in the parking zone 111 of the disk 110.

Figure 2:
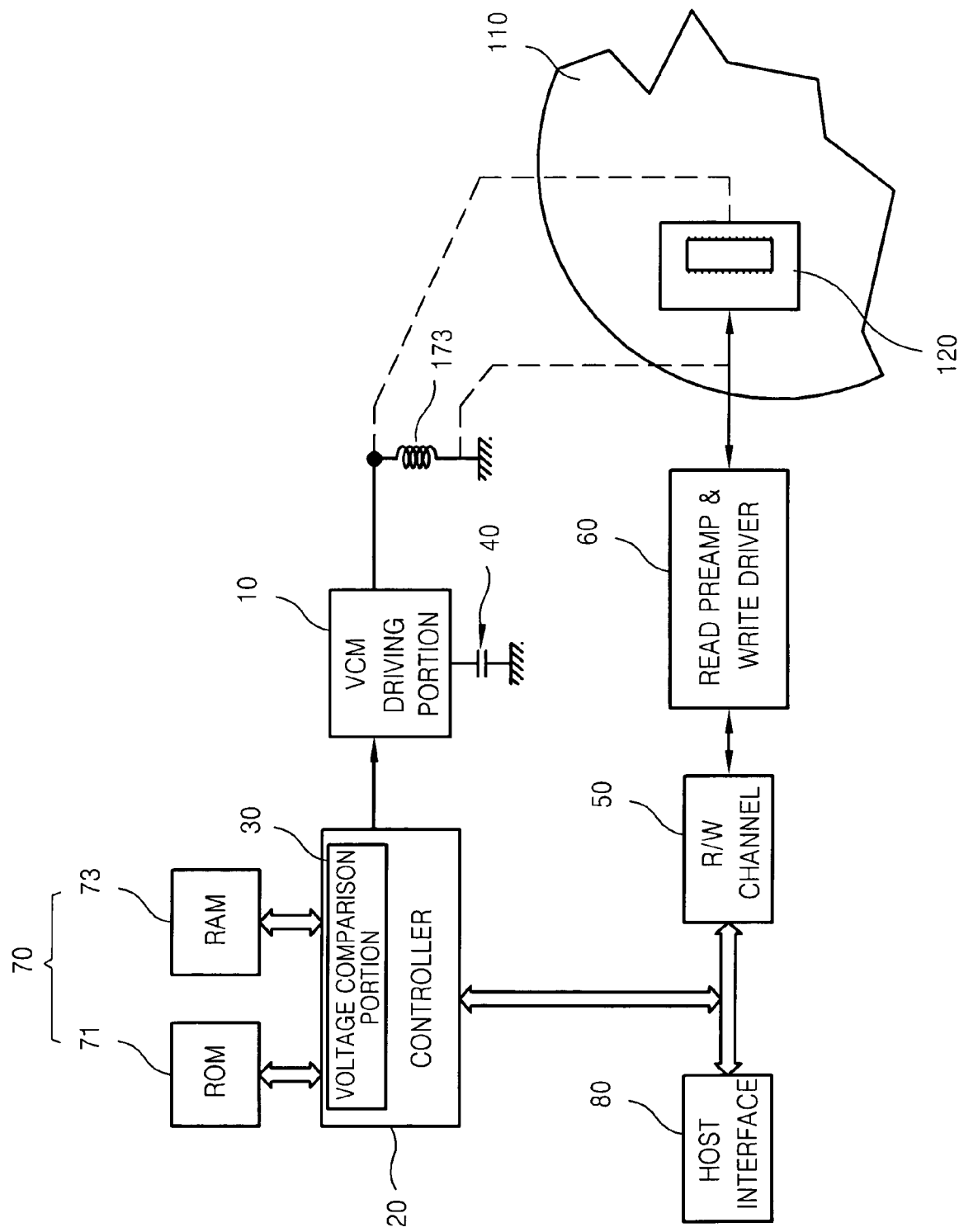
FIG. 2 is a block diagram of a drive circuit of the hard disk drive of FIG. 1.
Figure 3:
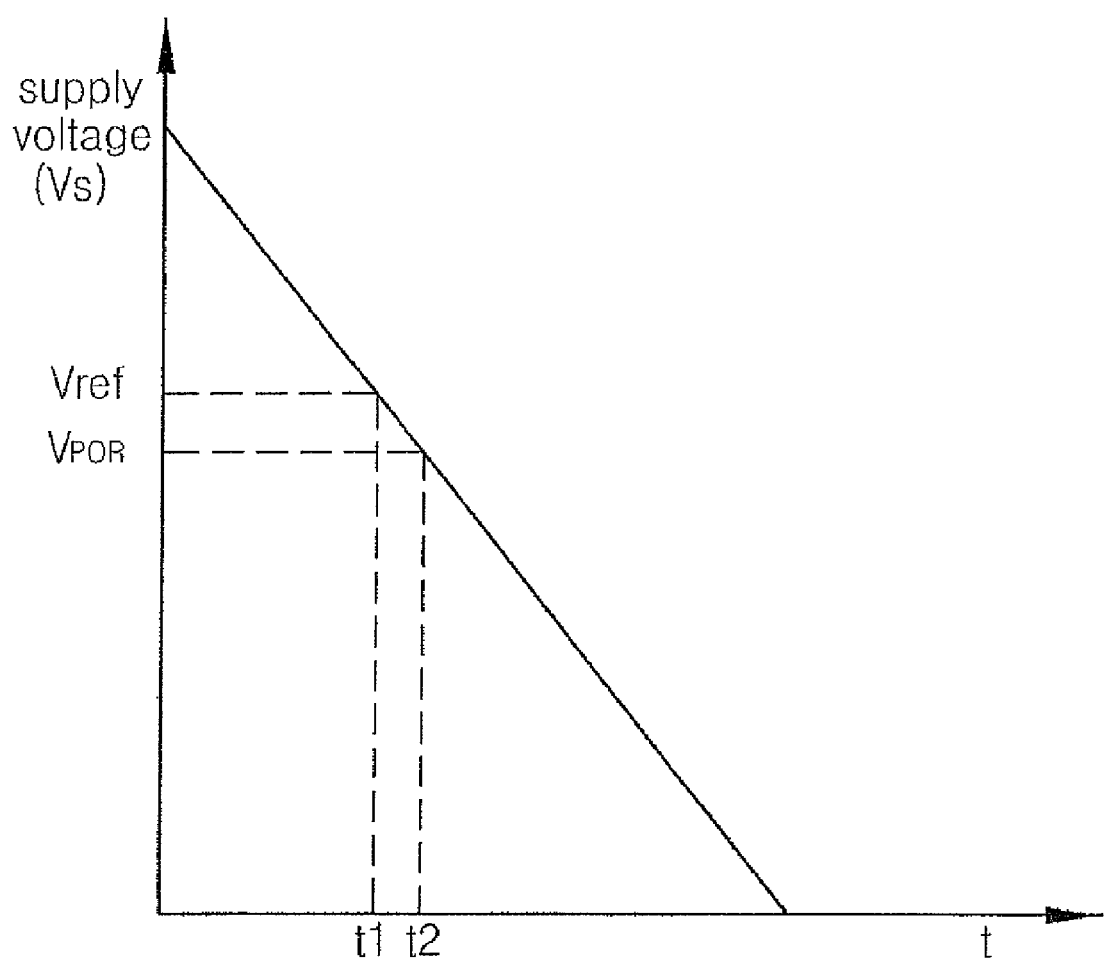
FIG. 3 is a graph showing a change in the supply voltage according to time when the magnetic head of the hard disk drive of FIG. 1 is parked.
Figure 4:
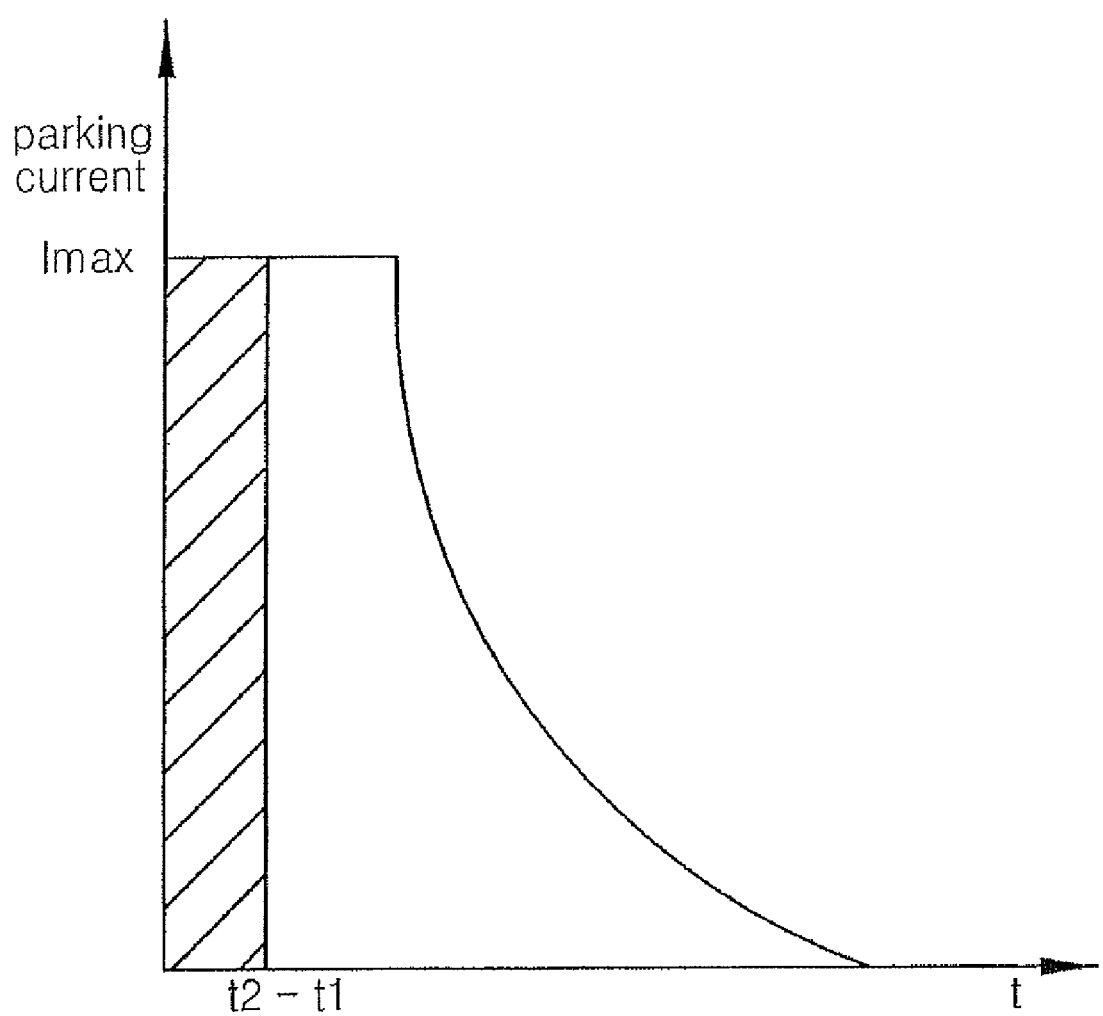
FIG. 4 is a graph showing a change in the parking current according to time when the magnetic head of the hard disk drive of FIG. 1 is parked.

FIG. 2 is a block diagram of a drive circuit of the hard disk drive of FIG. 1. FIG. 3 is a graph showing a change in the supply voltage according to time when the magnetic head of the hard disk drive of FIG. 1 is parked. FIG. 4 is a graph showing a change in the parking current according to time when the magnetic head of the hard disk drive of FIG. 1 is parked.

Referring to FIGS. 1 through 4, the hard disk drive 1 according to an embodiment of the present invention includes a VCM driving portion 10 for supplying drive current to the voice coil motor 170 and a controller 20 connected to the magnetic head 120 via a read/write (R/W) channel 50 and a read preamp and write driver 60. A read only memory 71 or non-volatile memory such as a flash memory and a random access memory (RAM) 73 are connected to the controller 20. A memory 70 consisting of the ROM 71 and the RAM 73 includes commands and data used by the controller 20 to execute software routines.

The controller 20 may be a digital signal processor (DSP), a microprocessor, or a microcontroller and can be embodied as software or firmware. The controller 20 supplies a control signal to the R/W channel 50 to read or write data with respect to the disk 110.

Information is typically transmitted from the R/W channel 50 to a host interface 80. The host interface 80 includes a control circuit to interface with a system such as a personal computer.

The R/W channel 50 performs a signal process by converting an analog signal that is read by the magnetic head 120 and amplified by the read preamp and write driver 60 into a digital signal that can be read by a host computer (not shown) and outputting the digital signal to the host interface 80, in a read mode, and by receiving user data from the host computer through the host interface 80, converting the user data into write current to be written to the disk 110, and outputting the write current to the read preamp and write driver 60, in a write mode.

The controller 20 is connected to the VCM driving portion 10 which supplies drive current to the voice coil 173 and provides a control signal to the VCM driving portion 10 to control the driving of the voice coil motor 170 and the motion of the magnetic head 120.

When the rotation of the disk 110 is stopped as in the case of turning off the power, the magnetic head 120 needs to be parked in the parking zone 111. To park the magnetic head in the parking zone 111, the control 20 compares a parking reference voltage Vref with a supply voltage Vs supplied to predetermined chips mounted on the PCB. When the supply voltage Vs is lower than the parking reference voltage Vref, for example, 2.8 v, the controller 20 controls the VCM driving portion 10 to apply current to park the magnetic head 120 in the parking zone 111 to the voice coil 173 of the voice coil motor 170 through the VCM driving portion 10. Since the parking reference voltage Vref is higher than a power-on-reset voltage $V_{POR}$, for example, 2.6 V, the controller 20 controls the VCM driving portion 10 such that the current is applied to the voice coil 173 until a power-on-reset (POR) function. The controller 20 controls the VCM driving portion 10 so that the maximum allowable current (Imax) can be applied to the voice coil 173 of the VCM 170 through the VCM driving portion 10. As shown in FIG. 2, in the present embodiment, the controller 20 includes a voltage comparison portion 30 which compares the parking reference voltage Vref with the supply voltage Vs supplied to the chips mounted on the PCB.

Also, the controller 20 compares the supply voltage Vs with the power-on-reset $V_{POR}$, for example, 2.6 V. When the supply voltage Vs is lower than the power-on-reset $V_{POR}$, the controller 20 cuts off the supply voltage Vs supplied to the chips mounted on the PCB. That is, when the voltage supplied to the PCB decreases less than a particular voltage, that is, the power-on-reset voltage $V_{POR}$, a POR function which cuts off the power supplied to all chips mounted on the PCB is performed. Thus, the time for the controller 20 to apply the current to park the magnetic head 120 in the parking zone 11 to the voice coil 173 via the VCM driving portion 10 is during a period from the detection of the parking reference voltage Vref to the detection of the power-on-reset $V_{POR}$, as shown in FIGS. 3 and 4.

The VCM driving portion 10 includes a capacitor 40 electrically connected to the voice coil 173 of the VCM 170. The capacitor 40 is charged when the power is supplied to the PCB. When the controller 20 cuts off the supply voltage Vs which is supplied to the chips on the PCB, a predetermined current is applied to the voice coil 173 of the VCM 170 through the VCM driving portion 10 to park the magnetic head 120.

Figure 5:
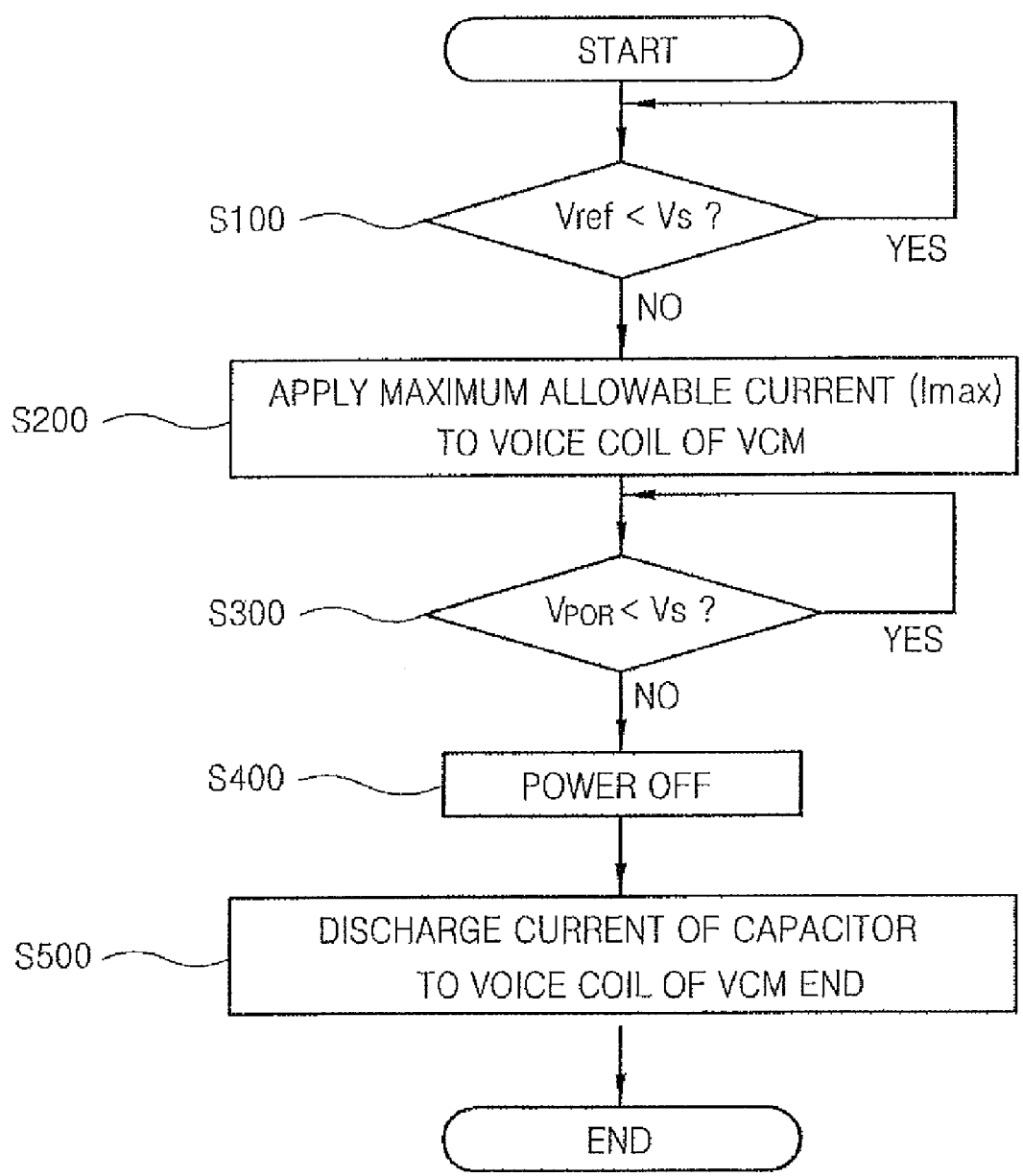
FIG. 5 is a flowchart for explaining a method for parking a magnetic head of the hard disk drive according to the present invention.

FIG. 5 is a flowchart for explaining a method for parking a magnetic head of the hard disk drive according to an embodiment of the present invention. Referring to FIGS. 1 through 5, a method of parking a magnetic head of a hard disk drive according to the present invention is described below.

When the rotation of the disk 110 is stopped as in the case of turning off the power, to park the magnetic head 120 in the parking zone 111, the voltage comparison portion 30 of the controller 20 compares the parking reference voltage Vref with the supply voltage Vs supplied to the chips on the PCB (S100). That is, whether the supply voltage Vs has reached the parking reference voltage Vref that is higher than the power-on-reset voltage $V_{POR}$.

When the supply voltage Vs is not lower than the parking reference voltage Vref, the process returns to operation S100.

When the supply voltage Vs is lower than the parking reference voltage Vref, the VCM driving portion 10 applies current to park the magnetic head 120 in the parking zone 111 to the voice coil 173 of the VCM 170 (S200). As shown in FIG. 4, the controller 20 controls the VCM driving portion 10 such that the maximum allowable current (Imax) can be applied to the voice coil 173 of the VCM 170 through the VCM driving portion 10. The VCM driving portion 10 applies the maximum allowable current (Imax) to the voice coil 173 so that the maximum allowable current (Imax) is supplied to the voice coil 173 until the POR function is performed. Accordingly, the role of the capacitor 40 can be minimized in the parking of the magnetic head 120. Thus, the minimum number of capacitors can be installed on the PCB.

Then, the voltage comparison portion 30 continues to compare the supply voltage Vs with the power-on-reset voltage $V_{POR}$ by monitoring the supply voltage Vs (S300). When the supply voltage Vs is lower than the power-on-reset voltage $V_{POR}$, the controller 20 performs the POR function to cut off the supply voltage Vs supplied to the chips on the PCB (S400). When the supply voltage Vs supplied to the chips on the PCB is cut off, the current charged in the capacitor 40 that is electrically connected to the voice coil 173 of the VCM 170 is applied to the voice coil 173 of the VCM 170 through the VCM driving portion 10 so that the magnetic head 120 is parked in the parking zone 111 (S500).

When the supply voltage Vs is not lower than the power-on-reset voltage $V_{POR}$, operation (S300) is repeated.

Figure 6:
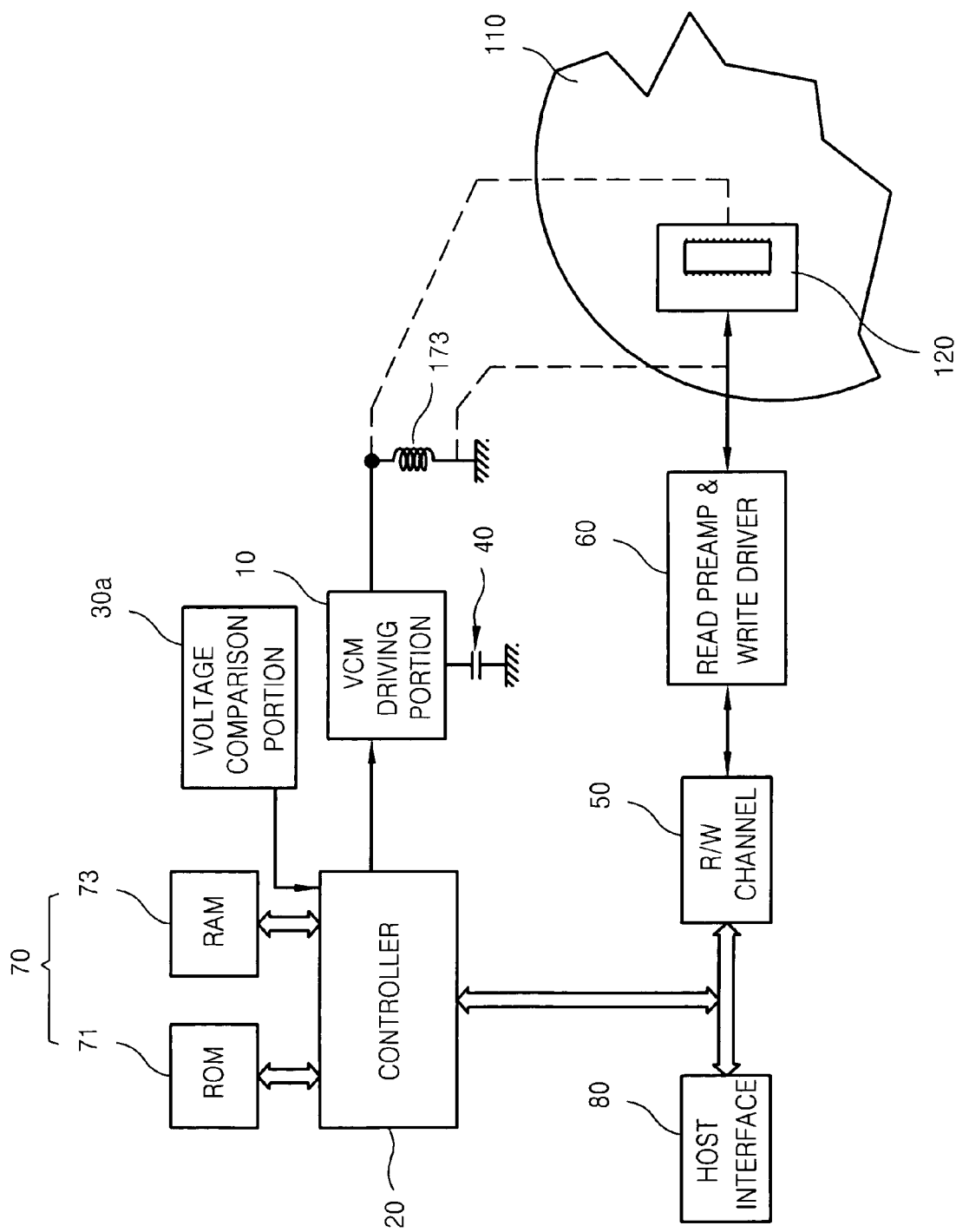
FIG. 6 is a block diagram of a drive circuit of the hard disk drive according to another embodiment of the present invention.

FIG. 6 is a block diagram of a drive circuit of the hard disk drive according to another embodiment of the present invention. Since the configuration of the drive circuit shown in FIG. 6 is similar to that of the drive circuit according to the previous embodiment shown in FIG. 2, only different elements will be described below. While like reference numerals are used for like elements having the same functions, the different elements are indicated by an "a" after the like reference numerals.

In the present embodiment, a voltage comparison portion 30a is embodiment separated from the controller 20 unlike the previous embodiment in which the voltage comparison portion 30 is embodied inside the controller 20.

In the previous embodiment shown in FIG. 2, when the supply voltage Vs reaches the parking reference voltage Vref, the maximum allowable current is applied to the voice coil 173 through the VCM driving portion 10. When the supply voltage Vs reaches the power-on-reset voltage $V_{POR}$ so that the power supply is discontinued, the capacitor 40 discharges current to the voice coil 173 through the VCM driving portion 10 to park the magnetic head 120. However, if the magnetic head 120 can be parked by applying the maximum allowable current from the VCM driving portion 10 to the voice coil 173 until the supply voltage Vs reaches the power-on-reset voltage $V_{POR}$ from the parking reference voltage Vref according to the design of the VCM 170, the capacitor 40 electrically connected to the voice coil 173 does not need to be installed.

According to the above-described embodiments of the present invention, without using the counter electromotive force of the spindle motor, the magnetic head of the hard disk drive can be parked in a predetermined parking zone. The number of the capacitor electrically connected to the voice coil of the VCM is reduced compared to the conventional art, a space for a PCB for installing the capacitor is reduce so that the space for PCB can be effectively used, and a manufacturing cost is reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A hard disk drive comprising:
   a voice coil motor driving portion which supplies drive current to a voice coil motor;
   a controller which compares a supply voltage supplied to predetermined chips installed on a printed circuit board with a parking reference voltage previously set to a voltage higher than a power-on-reset voltage and controls the voice coil motor driving portion to apply current to a voice coil of the voice coil motor through the voice coil motor driving portion to park a magnetic head in a predetermined parking zone, when the supply voltage is lower than the parking reference voltage; and
   a capacitor which is electrically connected to the voice coil of the voice coil motor and parks the magnetic head without using counter electromotive force of a spindle motor by applying predetermined current to the voice coil of the voice coil motor through the voice coil motor driving portion when the supply voltage supplied to the chips on the printed circuit board is cut off.

2. The hard disk drive of claim 1, wherein the controller comprises a voltage comparison portion which compares the supply voltage supplied to the chips on the printed circuit board with the parking reference voltage.

3. The hard disk drive of claim 1, wherein the controller compares the supply voltage with the power-on-reset voltage and cuts off the supply voltage supplied to the chips on the printed circuit board when the supply voltage is lower than the power-on-reset voltage.

4. The hard disk drive of claim 1, wherein the controller controls the voice coil motor driving portion such that a maximum allowable current is applied to the voice coil of the voice coil motor through the voice coil motor driving portion when current to park the magnetic head in a predetermined parking zone is applied to the voice coil of the voice coil motor through the voice coil motor driving portion.

5. A hard disk drive comprising:
   a voice coil motor driving portion which supplies drive current to a voice coil motor; and
   a voltage comparison portion which compares a supply voltage supplied to predetermined chips installed on a printed circuit board with a parking reference voltage previously set to a voltage higher than a power-on-reset voltage; and
   a controller which controls the voice coil motor driving portion to apply current to a voice coil of the voice coil motor through the voice coil motor driving portion to park a magnetic head in a predetermined parking zone, when the supply voltage is lower than the parking reference voltage,
   wherein the voice coil motor driving portion includes a capacitor which is electrically connected to the voice coil of the voice coil motor and parks the magnetic head without using counter electromotive force of a spindle motor by applying predetermined current to the voice coil of the voice coil motor through the voice coil motor driving portion when the supply voltage supplied to the chips on the printed circuit board is cut off.

6. The hard disk drive of claim 5, wherein the controller compares the supply voltage with the power-on-reset voltage and cuts off the supply voltage supplied to the chips on the printed circuit board when the supply voltage is lower than the power-on-reset voltage.

7. The hard disk drive of claim 5, wherein the controller controls the voice coil motor driving portion such that a maximum allowable current is applied to the voice coil of the voice coil motor through the voice coil motor driving portion when current to park the magnetic head in a predetermined parking zone is applied to the voice coil of the voice coil motor through the voice coil motor driving portion.

8. A method of parking a magnetic head of a hard disk drive, the method comprising:
   comparing a supply voltage supplied to predetermined chips installed on a printed circuit board with a parking reference voltage previously set to a voltage higher than a power-on-reset voltage;
   applying current to a voice coil of a voice coil motor through a voice coil motor driving portion that supplies drive current to the voice coil motor to park the magnetic head in a predetermined parking zone, when the supply voltage is lower than the parking reference voltage; and
   parking the magnetic head without using counter electromotive force of a spindle motor by applying current charged in a capacitor that is electrically connected to the voice coil of the voice coil motor to the voice coil of the voice coil motor through the voice coil motor driving portion when the supply voltage is cut off.

9. The method of claim 8, further comprising:
   comparing the supply voltage with the power-on-reset voltage; and
   cutting off the supply voltage that is supplied to the chips on the printed circuit board when the supply voltage is lower than the power-on-reset voltage.

10. The method of claim 8, wherein, in the applying of current to a voice coil of the voice coil motor through a voice coil motor driving portion to park a magnetic head in a predetermined parking zone, a maximum allowable current is applied to the voice coil of the voice coil motor through the voice coil motor driving portion.

11. A head parking method, consisting essentially of:
   determining whether a supply voltage applied to chips on a printed circuit board is less than a parking reference voltage of a controller, the parking reference voltage being greater than a power-on-reset voltage;
   applying a maximum allowable current to a voice coil of a voice coil motor to park the head until the power-on-reset is executed, when the supply voltage is less than the reference voltage;
   determining whether the power-on-reset voltage is less than the supply voltage;
   stopping a supply of the supply current, when the supply voltage is lower than the power-on-reset voltage; and
   discharging a capacitor to the voice coil to park the head, after the stopping.

* * * * *

UNITED STATES PATENT AND TRADEMARK OFFICE
CERTIFICATE OF CORRECTION

PATENT NO. : 7,952,828 B2
APPLICATION NO. : 11/359579
DATED : May 31, 2011
INVENTOR(S) : Hyung-Joon Cho et al.

Page 1 of 1

It is certified that error appears in the above-identified patent and that said Letters Patent is hereby corrected as shown below:

Column 10, Line 13-14, In Claim 8, after "the voice coil of the voice coil motor" delete "to the voice coil of the voice coil motor". (Second Occurrence)

Signed and Sealed this
Fourteenth Day of February, 2012

David J. Kappos
*Director of the United States Patent and Trademark Office*